United States Patent
Kadowaki

(10) Patent No.: US 9,591,279 B2
(45) Date of Patent: Mar. 7, 2017

(54) LIGHT SOURCE UNIT, CONTROL METHOD THEREOF, AND PROJECTION-TYPE DISPLAY APPARATUS

(71) Applicant: CANON KABUSHIKI KAISHA, Tokyo (JP)

(72) Inventor: Ryota Kadowaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 14/840,491

(22) Filed: Aug. 31, 2015

(65) Prior Publication Data

US 2016/0065922 A1    Mar. 3, 2016

(30) Foreign Application Priority Data

Sep. 2, 2014    (JP) .................. 2014-177841

(51) Int. Cl.
| | | |
|---|---|---|
| *H04N 9/31* | (2006.01) | |
| *G03B 21/20* | (2006.01) | |
| *H05B 33/08* | (2006.01) | |

(52) U.S. Cl.
CPC ......... *H04N 9/3155* (2013.01); *G03B 21/204* (2013.01); *H04N 9/3158* (2013.01); *H05B 33/0845* (2013.01)

(58) Field of Classification Search
CPC  G03B 21/204; G03B 21/208; G03B 21/2033; G03B 21/2053; G02B 6/0026; G02B 6/0068; G02B 6/0073
See application file for complete search history.

(56) References Cited

U.S. PATENT DOCUMENTS

| 8,562,146 B2 | 10/2013 | Kitano et al. | |
| 2004/0008326 A1* | 1/2004 | Koide | G09G 3/002 |
| | | | 353/99 |
| 2011/0199580 A1* | 8/2011 | Hirata | G03B 21/20 |
| | | | 353/31 |
| 2014/0132937 A1* | 5/2014 | Daniels | G03B 21/208 |
| | | | 353/98 |

FOREIGN PATENT DOCUMENTS

| JP | 2012108486 A | 6/2012 |
| JP | 2012189938 A | 10/2012 |

* cited by examiner

*Primary Examiner* — Sultan Chowdhury
(74) *Attorney, Agent, or Firm* — Rossi, Kimms & McDowell LLP

(57) ABSTRACT

A light source unit includes a fluorescent member configured to emit, when irradiated with excitation light, fluorescence light having a wavelength different from a wavelength of the excitation light, and a controller configured to adjust a conversion efficiency from the excitation light to the fluorescence light of the fluorescent member so that a gradient T satisfies $0.35G \leq T \leq 0.8G$ in a fluorescence characteristic of the fluorescent member when a horizontal axis represents a normalized light intensity of the excitation light so that a maximum light intensity of the excitation light incident on the fluorescent member is normalized to 1, and a vertical axis represents the light intensity of the fluorescence light from the fluorescent member irradiated with the normalized light intensity of the excitation light, where G represents a gradient in the fluorescence characteristic when the normalized light intensity of the excitation light is 0.3.

12 Claims, 5 Drawing Sheets

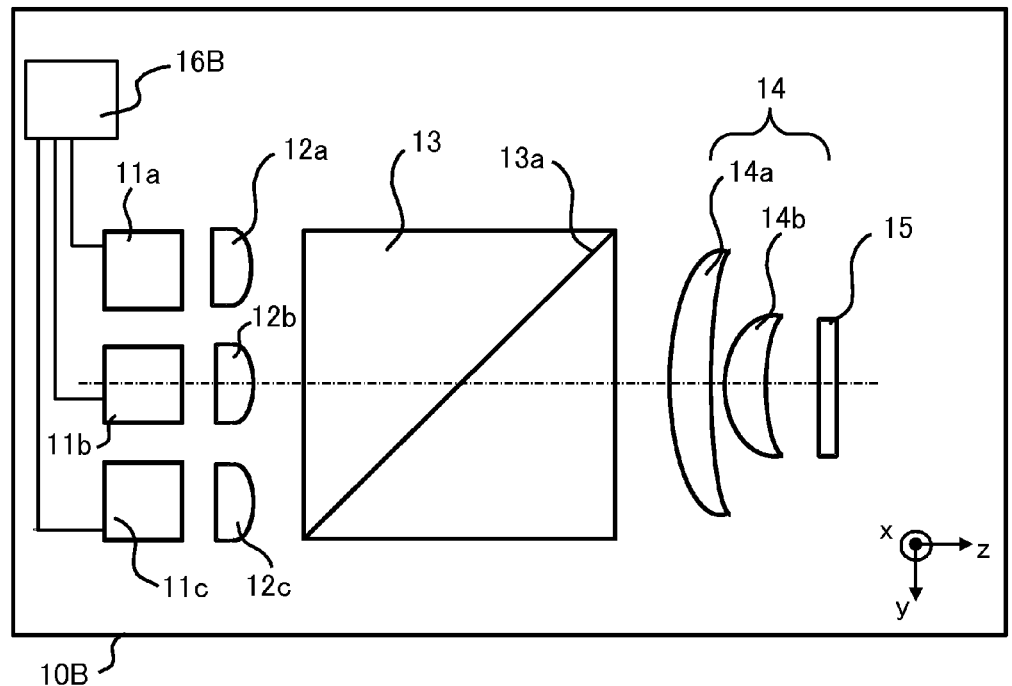
FIG. 7
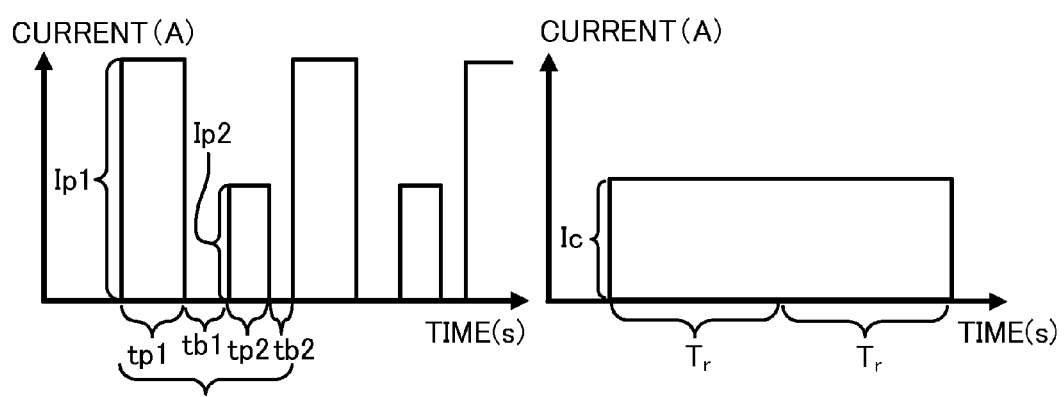
FIG. 8A
FIG. 8B

LIGHT SOURCE UNIT, CONTROL METHOD THEREOF, AND PROJECTION-TYPE DISPLAY APPARATUS

BACKGROUND OF THE INVENTION

Field of the Invention

The present invention relates to a light source unit, a control method thereof, and a projection-type display apparatus.

Description of the Related Art

There is proposed for a projection-type display apparatus such as a liquid crystal projector, a method of irradiating a fluorescent member (phosphor) with light from a light source (hereinafter, referred to as a "solid-state light source") that includes a semiconductor such as a light-emitting diode (LED) and a laser and of using light having a converted wavelength. Excitation light is blue, and fluorescence includes a wavelength band of a plurality of color beams corresponding to three primary colors of light. The light source can be configured to emit light in a wide wavelength band by synthesizing the excitation light and the fluorescence, and the color of a projected image can be adjusted by applying this light source to the projection-type display apparatus.

For example, Japanese Patent Laid-open No. ("JP") 2012-108486 discloses a configuration in which excitation light is guided onto a fluorescent member by using a polarizing beam splitter ("PBS"). The PBS selectively transmits and reflects light having the wavelength of the excitation light, and reflects light having the wavelength of fluorescence. Part of the excitation light incident on the fluorescent member is dispersively reflected because its polarization is disordered. This disordered polarization due to the irradiation on the fluorescent member is exploited to reflect part of the excitation light at the PBS and to synthesize the excitation light with the fluorescence so as to output both lights. JP 2012-189938 discloses a method of mixing a dispersive filler with a device including a fluorescent member and of outputting both fluorescence and excitation light when the excitation light passes through the fluorescent member device.

The method disclosed in JP 2012-108486 uniquely determines the ratio of the excitation light and the fluorescence by the transmission-reflection characteristic of the PBS or the area ratio of fluorescent member region distributed over a fluorescent member device. The method disclosed in JP 2012-189938 determines the ratio of the excitation light and the fluorescence by the mixing amount of the filler. Therefore, none of the prior art references can change the ratio of the excitation light and the fluorescence after the light source unit is produced.

SUMMARY OF THE INVENTION

The present invention provides a light source unit capable of adjusting a ratio of fluorescence and excitation light, a method of controlling the light source unit, and a projection-type display apparatus.

A light source unit as an aspect of the present invention includes a light source configured to emit excitation light having a first wavelength, a fluorescent member configured to emit, when irradiated with the excitation light from the light source, fluorescence light having a second wavelength different from the first wavelength, and an adjuster configured to adjust a conversion efficiency from the excitation light to the fluorescence light of the fluorescent member so that a gradient, denoted by T, satisfies $0.35G \leq T \leq 0.8G$ in a fluorescence characteristic of the fluorescent member when a horizontal axis represents a normalized light intensity of the excitation light so that a maximum light intensity of the excitation light incident on the fluorescent member is normalized to 1, and a vertical axis represents the light intensity of the fluorescence light emitted from the fluorescence member that is irradiated with the normalized light intensity of the excitation light, where G represents a gradient in the fluorescence characteristic when the normalized light intensity of the excitation light is 0.3.

Further features and aspects of the present invention will become apparent from the following description of exemplary embodiments with reference to the attached drawings.

BRIEF DESCRIPTION OF THE DRAWINGS

FIG. 7 is a schematic sectional view of a light source unit according to Embodiment 2 of the present invention.

FIGS. 8A and 8B are graphs illustrating a method of driving the light source illustrated in FIG. 7 according to Embodiment 2.

DESCRIPTION OF THE EMBODIMENTS

Exemplary embodiments of the present invention will be described below with reference to the accompanying drawings.

Embodiment 1

Figure 9:
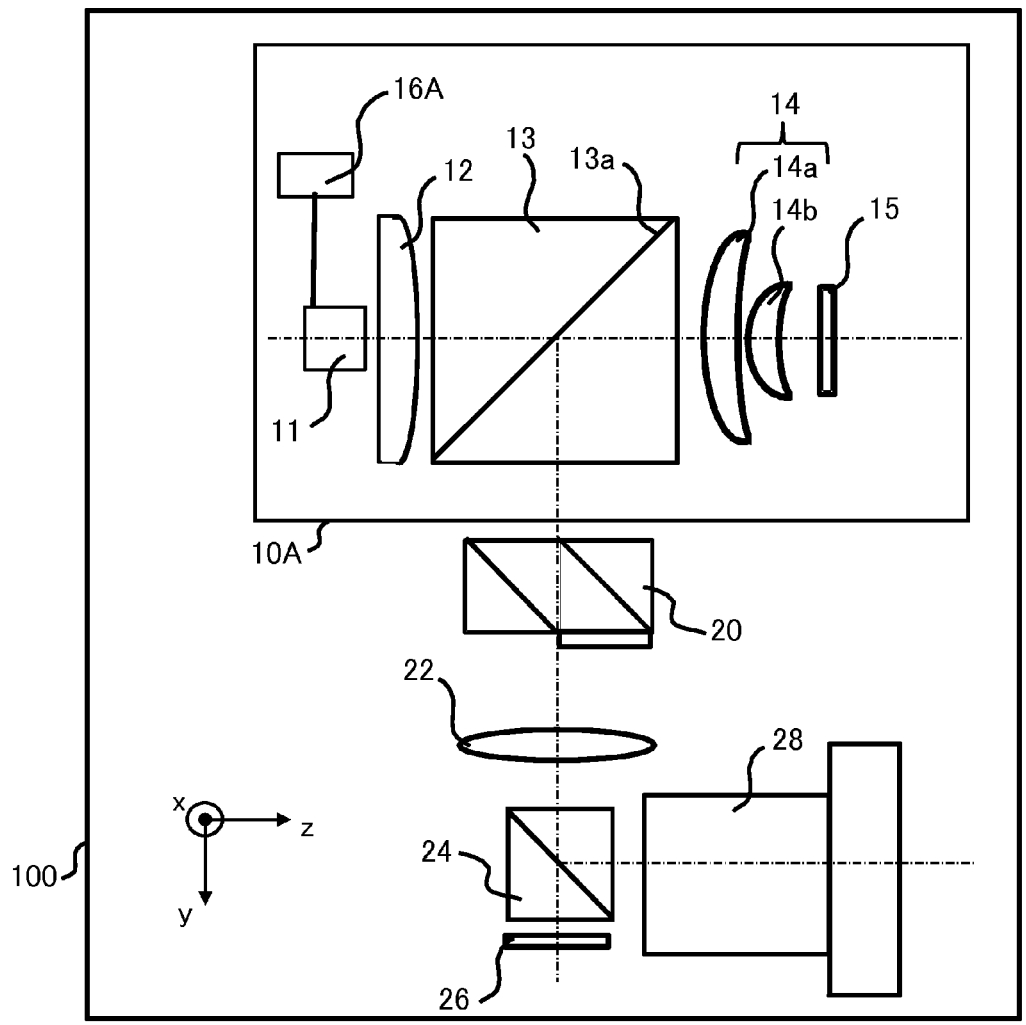
FIG. 9 is a block diagram of an illumination optical system according to Embodiment 1.

FIG. 9 is a block diagram of a liquid crystal projector (projection-type display apparatus) 100 according to Embodiment 1 of the present invention. The liquid crystal projector 100 includes a light source unit 10A, an illumination optical system, an image display element 26, and a projection lens 28. FIG. 9 illustrates one image display element for simplification, but a plurality of image display elements may be provided for respective RGB color beams.

The light source unit 10A outputs synthesized light of excitation light and fluorescence (or fluorescence light). The ratio of the excitation light and the fluorescence is changeable through an input operation by a user (that is, manually) or automatically, and the change is made by exploiting luminance saturation of a fluorescent member 15 as described later. The ratio of the excitation light and the fluorescence may be automatically changed, for example, based on the color balance of a projected image. The configuration of the light source unit 10A will be described later.

The illumination optical system includes a polarization converter 20, a condenser lens 22, and a polarizing beam splitter (PBS) 24, and is used to illuminate the image display element 26, such as a liquid crystal panel, with light from the light source unit 10A. The polarization converter 20 aligns the polarization direction of illumination light as a mixture of P-polarized and S-polarized lights from the light source unit 10A with one direction, for example, the P-polarization. The condenser lens 22 condenses light from the polarization converter 20. The PBS 24 transmits the P-polarized light and reflects the S-polarized light. The image display element 26 is a reflective light modulator that modulates and reflects light from the PBS 24 depending on an input image signal. Light reflected by the image display element 26 and turned into the S-polarized light is reflected by the PBS 24, guided to the projection lens 28, and then projected onto a nonillustrated projection surface such as a screen in an enlarged size.

Figure 1:
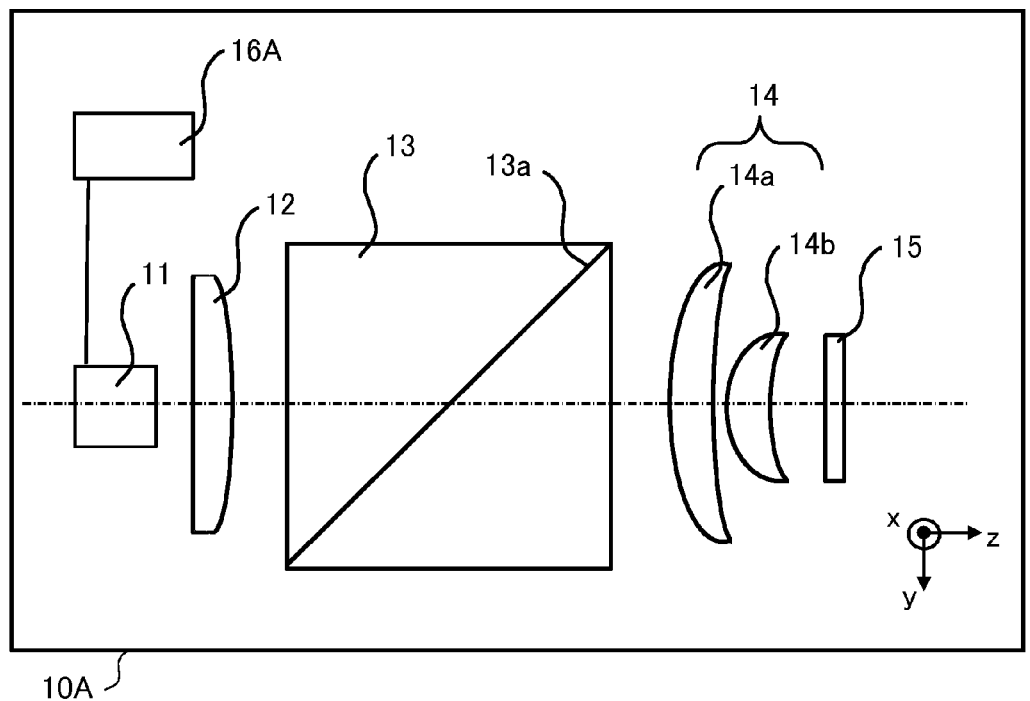
FIG. 1 is a schematic sectional view of a light source unit according to Embodiment 1 of the present invention.

FIG. 1 is a schematic sectional view of the light source unit 10A. The light source unit 10A includes a light source 11, a collimator lens 12, a dichroic polarizing beam splitter (DPBS) 13, a condenser optical system 14, the fluorescent member 15, and a controller 16A. A dashed and single-dotted line represents an optical axis.

Figure 2:
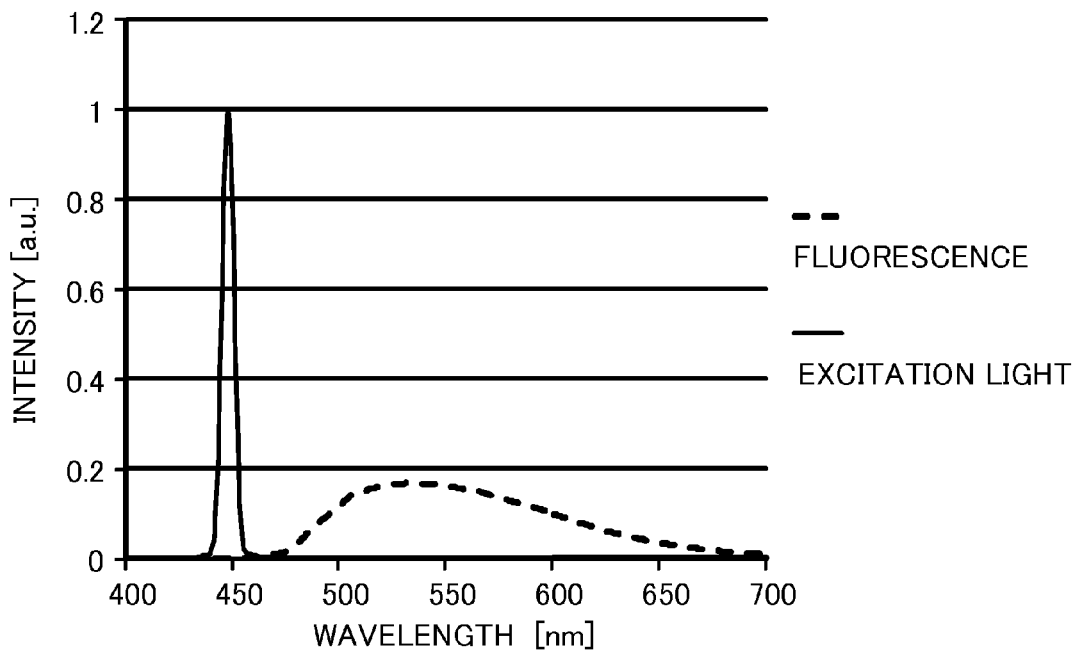
FIG. 2 is a graph illustrating spectra of excitation light from the light source illustrated in FIG. 1 and fluorescence emitted from a fluorescent member according to Embodiment 1.

The light source 11 emits the excitation light and is a laser diode in this embodiment. FIG. 2 is a graph illustrating spectra of lights from the light source 11 and the fluorescent member 15 according to this embodiment in a wavelength band (400 nm to 700 nm) of visible light. In the graph, the vertical axis represents the light intensity (arbitrary unit), and the horizontal axis represents the wavelength (nm). A dotted line represents the spectrum of the fluorescence from the fluorescent member 15, and a solid line represents the spectrum of the excitation light emitted from the light source 11.

As illustrated in FIG. 2, the excitation light emitted from the light source 11 is blue light in a narrow band having a peak at a wavelength (first wavelength) of 445 nm approximately, and is normalized with the light intensity at the first wavelength in FIG. 2. The light source 11 is not limited to a laser diode, and may be another solid-state light source such as an LED. The fluorescence has a wavelength band (second wavelength) of 460 nm to 700 nm, which is different from the wavelength of the excitation light, and has a peak near a wavelength of 540 nm. As illustrated in FIG. 2, each of the light source 11 in this embodiment and other solid-state light sources emits light that has a wavelength shorter than that of light emitted from the fluorescent member 15.

The collimator lens 12 is a plano-convex lens whose plane is disposed on the side of the light source 11, and converts light beams from the light source 11 into collimated beams.

Figure 3:
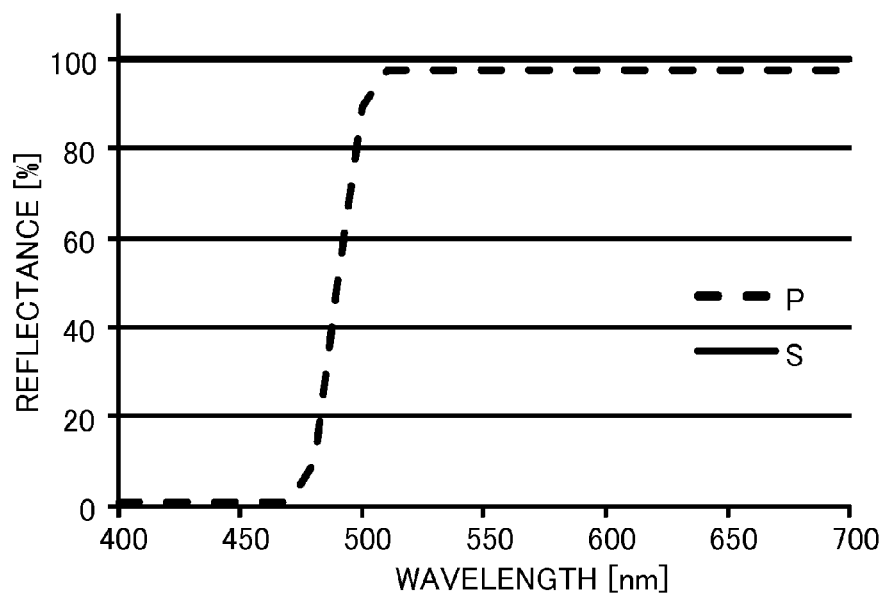
FIG. 3 is a graph illustrating a wavelength characteristic of a dichroic polarizing beam splitter illustrated in FIG. 1 according to Embodiment 1.

The DPBS 13 includes a splitting plane 13a, and transmits or reflects light in the wavelength band of the light source 11 depending on the polarization direction of the light, and reflects the light from the fluorescent member 15. FIG. 3 is a graph illustrating a reflection characteristic of the DPBS 13. In FIG. 3, the vertical axis represents the reflectance (%), and the horizontal axis represents the wavelength (nm). A dashed line represents the reflectance of P-polarized light, and a solid line represents the reflectance of S-polarized light.

As illustrated in FIG. 3, the DPBS 13 reflects 100% of incident S-polarized light in the wavelength band of visible light at the separation plane 13a. The DPBS 13 transmits 100% of incident P-polarized light having wavelengths of 400 to 470 nm approximately, and reflects 100% of incident P-polarized light having wavelengths of 525 nm to 700 nm approximately. The DPBS 13 transmits or reflects incident P-polarized light having wavelengths of 470 to 525 nm approximately, depending on its wavelength.

In this embodiment, the light source 11 emits P-polarized light, and the DPBS 13 transmits 100% of the P-polarized light at the wavelength (445 nm approximately) of the light source 11. Thus, the DPBS 13 transmits the excitation light from the light source 11.

The condenser optical system 14, which includes condenser lenses 14a and 14b, condenses the excitation light transmitted through the DPBS 13 on the fluorescent member 15 and has the functionality of parallelizing and taking in dispersive fluorescence. The condenser lenses 14a and 14b each have a convex surface disposed on the side of the light source and a concave surface disposed on the side of the fluorescent member, but are not limited to this configuration.

The fluorescent member 15 absorbs most of incident excitation light, and emits fluorescence (green light and red light) having a wavelength longer than that of the excitation light. Part of the excitation light incident on the fluorescent member 15 is dispersively reflected. The excitation light thus dispersively reflected is randomly polarized. The fluorescence and the dispersively reflected light from the fluorescent member 15 transmit through the condenser optical system 14 again and are turned into collimated beams.

The fluorescence is reflected by the DPBS 13. The S-polarized component of the dispersively reflected excitation light, which is orthogonal to the incident light, is reflected by the DPBS 13. The number of lenses included in the condenser optical system 14 is changeable depending on settings of the efficiencies of the condensation to the fluorescent member 15 and of the intake of light from the fluorescent member 15. The number of lenses may be one, or three or more. Consequently, the separation plane 13a of the DPBS 13 reflects the fluorescence and the S-polarized component of the excitation light in a downward direction vertical to the optical axis illustrated in FIG. 1. In this embodiment, the controller 16A adjusts the ratio of the excitation light and the fluorescence.

The controller 16A includes a nonillustrated microcomputer and memory (storage). The controller 16A may be replaced with a controller that controls the operation of each component of the projection-type display apparatus 100 illustrated in FIG. 9. The controller 16A adjusts output of the excitation light by changing an electric current and a voltage that are applied to the light source 11 or an electric power, and also serves as an adjuster that adjusts the ratio of the excitation light and the fluorescence by exploiting the luminance saturation of the fluorescent member 15.

When the fluorescent member 15 is irradiated with the excitation light, an increased output of the excitation light due to an increased electric power applied to the light source 11 leads to an increased output of the fluorescence from the fluorescent member 15. The electric power and the output of the fluorescence (or the conversion efficiency of the excitation light into the fluorescence) are substantially proportional to each other at low electric powers, but the conversion efficiency is reduced at higher electric powers. This phenomenon of the reduction of the conversion efficiency (or phenomenon that the luminance does not increase proportionally to the excitation intensity) is called the "luminance saturation." Conventionally, the fluorescence has been taken out of the fluorescent member 15 through irradiation with the excitation light in a range with a low luminance saturation (or with the conversion efficiency higher than a certain value). However, in this embodiment, the ratio of the excitation light and the fluorescence is changed in a range with a high luminance saturation.

Figure 6:
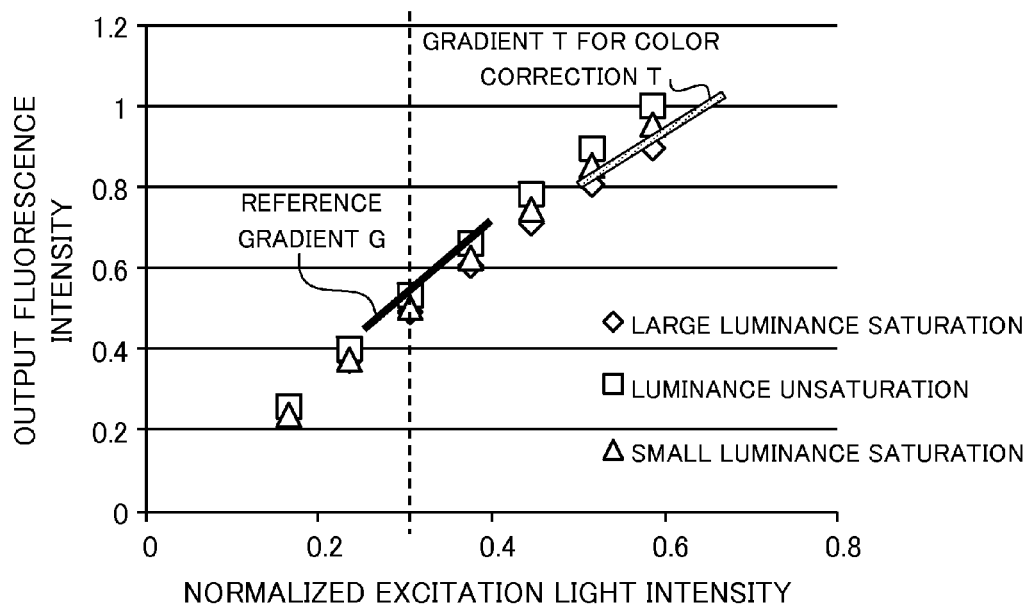
FIG. 6 is a graph illustrating a fluorescence characteristic of the fluorescent member according to Embodiment 1.

FIG. 6 is a graph of the light intensity of the excitation light incident on the fluorescent member 15 and the light intensity of the fluorescence output from the fluorescent member 15, which illustrates a fluorescence characteristic of the fluorescent member 15. In FIG. 6, the horizontal axis represents a normalized light intensity x (first light intensity) of the excitation light incident on the fluorescent member 15, and the vertical axis represents a normalized light intensity y (second light intensity) of the fluorescence output from the fluorescent member 15. On the horizontal axis, the light intensity x is normalized so that the light intensity of the excitation light incident on the fluorescent member 15 at the maximum electric power adjustable by the controller 16A and the minimum diameter at which the condenser optical system 14 can condense light, which is the maximum light intensity of the excitation light incident on the fluorescent member 15, is normalized to 1. A square represents an ideal state (luminance unsaturation state) in which the fluorescent member 15 has not reached the luminance saturation. A triangle represents a state in which the luminance saturation of the fluorescent member 15 is low, and a rhombus represents a state in which the luminance saturation of the fluorescent member 15 is high.

This embodiment uses, as a reference gradient G, a gradient (=y/x) when the normalized light intensity of the excitation light is 0.3 (30%) on the horizontal axis. The value of 0.3 is selected because the luminance saturation amount is sufficiently small at the value. The gradient when the luminance saturation amount is sufficiently small is substantially the same as that of the luminance unsaturation state. The reference gradient may be a gradient when the normalized light intensity of the excitation light has an arbitrary value of 0.3 or smaller (and larger than 0). This is because that gradient is also substantially the same as that of the luminance unsaturation state.

To change the ratio of the excitation light and the fluorescence for a color correction, the controller 16A adjusts the light intensity of the excitation light so that a condition defined by Expression below is satisfied.

$$0.35G \leq T \leq 0.8G \quad (1)$$

When the gradient, denoted by T, is 0.8G, for example, the fluorescence component is reduced by 5%, and the blue component of the same wavelength as the excitation light is increased by 18%. When the gradient T is 0.35G, for example, the fluorescence component is reduced by 17%, and the blue component of the same wavelength as the excitation light is increased by 34%. The upper limit value of Expression 1 is set to obtain the minimum required color correction effect (of, for example, reducing the ratio of the fluorescence component when the fluorescence component in output light is strong). The lower limit value of Expression 1 is set to prevent the color (blue) of the same wavelength as the excitation light from being too strong in the output light.

The controller 16A stores in a memory, for example, the relationship among the gradient T, the effect of reducing the fluorescence component, and the effect of increasing the blue component. Then, the controller 16A acquires information of the color balance of an image projected on the screen from a nonillustrated detector, acquires the gradient T in the range of Expression 1 based on the information, and changes the normalized light intensity of the excitation light (light irradiation density) to obtain the value x corresponding to the gradient T. The detector may detect the emission spectrum output from the DPBS 13.

To change the normalized light intensity of the excitation light, the controller 16A adjusts the electric power (at least one of the voltage and the current) applied to the light source 11 and the condensation diameter (spot diameter) of the excitation light by adjusting the position of the condenser optical system 14 on the optical axis.

Figures 4A, 4B:
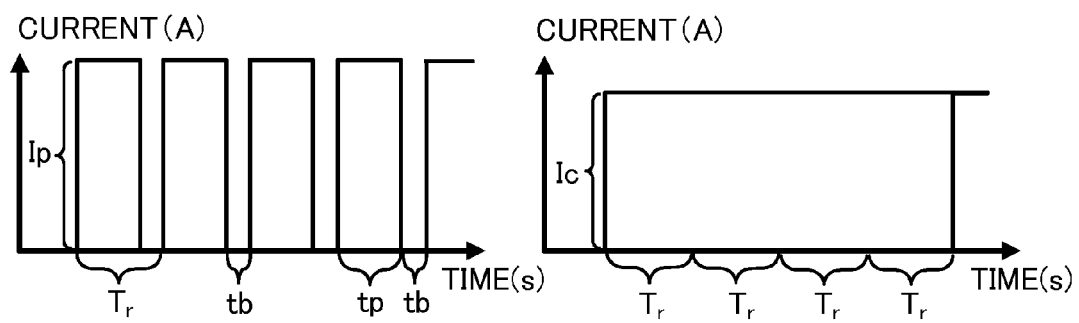
FIGS. 4A and 4B are graphs illustrating a method of driving a light source illustrated in FIG. 1 according to Embodiment 1.

Next follows a description of a method of driving the light source 11. FIGS. 4A and 4B are diagrams for describing the method of driving the light source 11 by the controller 16A. In FIGS. 4A and 4B, the horizontal axis represents time (s), and the vertical axis represents the current (A). FIG. 4A is a graph of the current applied to the light source 11 for intermittent drive (pulse drive) of the light source 11, and the maximum value of the applied current is denoted by Ip. FIG. 4B is a graph of the applied current for continuous drive of the light source 11, and the maximum value of the applied current is denoted by Ic.

The controller 16A first continuously drives the light source 11, as illustrated in FIG. 4B, to obtain the light intensity of the excitation light satisfying a condition defined by Expression 2, and then increases the current to obtain the gradient T in the range of Expression 1 for the color correction.

$$0.8G < T \leq 1.0G \quad (2)$$

The light source unit 10A is set in such an initial state that the light source 11 is driven in the range of Expression 2 by the controller 16A, and the cooling capacity of a nonillustrated cooler that cools the light source 11 is set for the light source 11 in this driving state. However, the electric power increases as the current is increased while the voltage is kept constant, and thus the temperature of the light source 11 is likely to rise in the color correction unless the cooling capacity is changed. The output characteristic of the light source 11 is sensitive to temperature, and the output of the light source 11 decreases when it becomes hot. Thus, such a cooling condition may be set that the light source 11 does not become hot in the color correction.

In this embodiment, the controller 16A switches drive of the light source 11 from the continuous drive illustrated in FIG. 4B to the intermittent drive illustrated in FIG. 4A. In the intermittent drive illustrated in FIG. 4A, tp represents a driving time, tb represents a non-driving time, and Tr (=tp+tb) represents a period. FIGS. 4A and 4B each illustrate a drive state for four periods (4 Tr). This embodiment sets Ip×tp=Ic×Tr to make electric power consumptions in the intermittent drive and in the continuous drive equal to each other in a time duration of 4 Tr. This configuration can maintain the temperature of the light source 11 constant while maintaining the cooling capacity.

Figure 5:
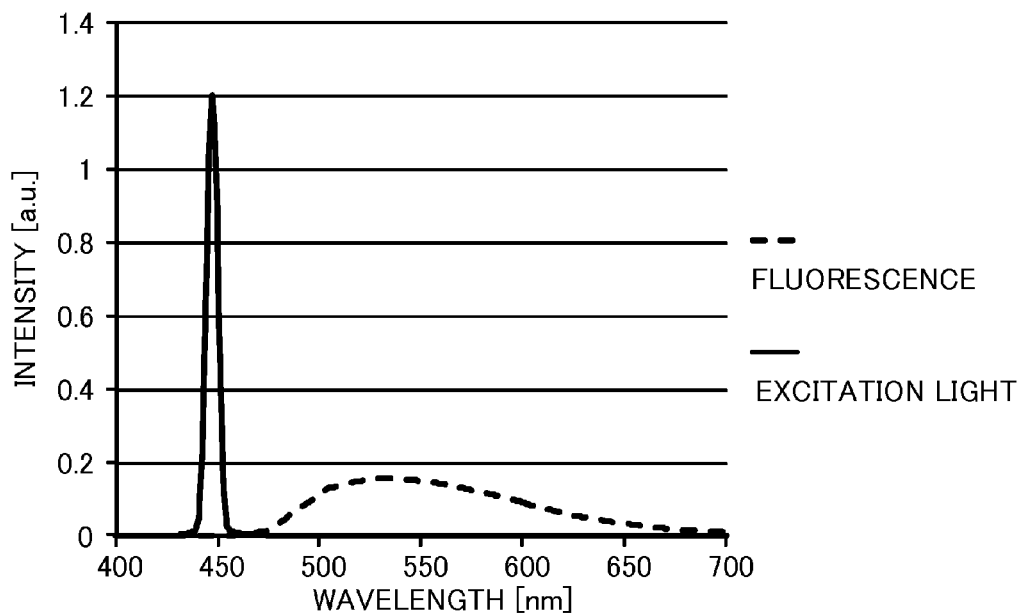
FIG. 5 is a graph illustrating spectra of excitation light from the light source driven by the driving method illustrated in FIG. 4A and light emitted from the fluorescent member according to Embodiment 1.

This embodiment sets the maximum value Ip of the applied current in the intermittent drive by increasing the maximum value Ic of the applied current in the continuous drive by 20%. Specifically, the relationship of Ip=Ic×1.2 is held. When the controller 16A switches the drive of the light source 11 from the continuous drive to the intermittent drive, the applied electric power of the light source 11 is increased from the continuous drive, and the light irradiation density of the excitation light on the fluorescent member 15 is increased in the driving time tp. This switch consequently increases the luminance saturation amount, and the ratio of the excitation light from the light source 11, which is not converted into fluorescence and is dispersively reflected. FIG. 5 is a graph illustrating the spectra of the excitation light from the light source 11 and the fluorescence from the fluorescent member 15 in this case. The continuous drive illustrated in FIG. 4B corresponds to FIG. 2, and the intermittent drive illustrated in FIG. 4A corresponds to FIG. 5.

In the spectra in FIG. 5, the excitation light component has a peak intensity increased by 20%, and the fluorescence component has a peak intensity decreased by 6.7%, as compared to those illustrated in FIG. 2. As a result, the chromaticity coordinate of white changes from (x, y)=(0.3056, 0.3786) to (x, y)=(0.2929, 0.3475) in the xy color system.

The chromaticity coordinate of white can be changed by factors other than the light source unit 10A, such as a color filter. Thus, the coordinate is an example, and the amount and direction of the change can be determined through the ratio of the wavelengths of the excitation light and the fluorescence. An increased amount of the current may not be equal to an increased amount of the excitation light component depending on the fluorescent member 15, and in such a case, the current may be adjusted to obtain a desired change amount of the chromaticity coordinate.

In this embodiment, for a color correction to reduce the fluorescence component, for example, in a range that satisfies Expression 2 and the luminance saturation amount is significantly small, a change is made to the light intensity of the excitation light corresponding to a range in which the luminance saturation amount is large. This correction involves an adjustment to reduce the conversion efficiency from the excitation light to the fluorescence in the fluorescent member 15, and thus needs to increase the electric power applied to the light source 11 and/or to reduce the condensation diameter of the excitation light. To reduce the condensation diameter of the excitation light, the controller 16A moves the condenser optical system 14 in its optical-axis direction to change the degree of condensation.

The present invention is also applicable to, for example, a color correction to increase the fluorescence component after a change is once made to the light intensity of the excitation light corresponding to the range in which the luminance saturation amount is large. This correction involves an adjustment to increase the conversion efficiency from the excitation light to the fluorescence in the fluorescent member 15, and thus needs to reduce the electric power applied to the light source 11 and/or to increase the condensation diameter of the excitation light.

The adjustment of the conversion efficiency in the fluorescent member 15 is not limited to the adjustment of the light intensity of the excitation light incident on the fluorescent member 15, and may be the adjustment of the temperature (or heating and cooling) of the fluorescent member 15. The fluorescence characteristic illustrated in FIG. 6 is obtained at room temperature, and the conversion efficiency decreases at high temperature. A temperature adjuster that adjusts the temperature of the fluorescent member 15 may be provided and controlled by the controller 16A to change the temperature of the fluorescent member 15. The conversion efficiency may be reduced by heating the fluorescent member 15 or by reducing an electric power for driving the nonillustrated cooler that cools the fluorescent member 15.

Embodiment 2

FIG. 7 is a schematic sectional view of a light source unit 10B according to Embodiment 2 of the present invention, which is applicable in place of the light source unit 10A. The same components as those illustrated in FIG. 1 are denoted by the same reference numerals. Embodiment 2 differs from Embodiment 1 in that a plurality of (three, in this embodiment) light sources 11a to 11c are provided in place of the light source 11, a plurality of collimator lenses 12a to 12c corresponding to the respective light sources 11a to 11c are provided in place of the collimator lens 12, and a controller 16B is provided in place of the controller 16A. The controller 16B includes a microcomputer etc. and changes electric powers applied to the light sources 11a to 11c.

FIGS. 8A and 8B are diagrams for describing a method of driving the light sources 11a to 11c by the controller 16B. In FIGS. 8A and 8B, the horizontal axis represents time (s), and the vertical axis represents the current (A). FIG. 8A is a graph of the current applied to the light sources 11a to 11c in the intermittent drive of the light sources 11a to 11c, in which the maximum value of the applied current is denoted by Ip1 and an intermediate current value smaller than Ip1 is denoted by Ip2. FIG. 8B is a graph of the applied current to the light sources 11a to 11c in the continuous drive with a constant applied current value Ic.

The controller 16B first drives the light sources 11a to 11c in the continuous drive as illustrated in FIG. 8B to obtain the light intensity defined in Expression 2, and then switches the drive to the intermittent drive illustrated in FIG. 8A to obtain the gradient T defined in Expression 1 for a color correction.

In FIG. 8A, driving times of the intermittent drive are denoted by tp1 and tp2, non-driving times thereof are denoted by tb1 and tb2, and the period thereof is denoted by Tr (Tr=tp1+tb1+tp2+tb2). FIGS. 8A and 8B each illustrate a driving state for two periods (2Tr). The applied current has the current value Ip1 in the driving time tp1 (first driving time) and has the current value Ip2 in the driving time tp2 (second driving time). At a constant voltage, the light sources are driven at a first electric power in the driving time tp1 and driven at a second electric power in the driving time tp2. This embodiment sets Ip1=Ic×2, Ip1×tp1+Ip2×tp2=Ic×Tr, and tp1+tb1+tp2+tb2=Tr, to make electric power consumptions in the intermittent drive and in the continuous drive equal to each other in a time duration of 2Tr. This allows the temperatures of the light sources 11a to 11c to be maintained constant while maintaining the cooling condition.

To avoid the luminance saturation of the fluorescent member 15, the controller 16A drives the light sources 11a to 11c in the continuous drive as illustrated in FIG. 8B. To achieve the luminance saturation, the controller 16A drives the light source 11a in the intermittent drive as illustrated in FIG. 8A. Alternatively, it may be configured such that the controller 16B does not turn on the light source 11a to avoid the luminance saturation, and does turn on the light source 11a to achieve the luminance saturation. The controller 16B may change outputs of two laser diodes (light sources) or more to achieve the above control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the present invention is also applicable to a method of controlling a light source unit. In a fluorescence characteristic of the fluorescent member 15 with the first light intensity on the horizontal axis and the second light intensity on the vertical axis as illustrated in FIG. 6, the reference gradient G is set to be a gradient at the first light intensity of 0.3. Then, the control method includes the step of adjusting the efficiency of conversion from the excitation light to the fluorescence at the fluorescent member 15 to obtain the gradient T satisfying the condition of $0.35G \leq T \leq 0.8G$ in the fluorescence characteristic. The control method may be realized as a program executed by a computer.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiment(s) and/or that includes one or more circuits (e.g., application specific integrated circuit (ASIC)) for performing the functions of one or more of the above-described Embodiment(s), and by a method performed by the computer of the system or apparatus by, for example, reading out and executing the computer executable instructions from the storage medium to perform the functions of one or more of the above-described Embodiment(s) and/or controlling the one or more circuits to perform the functions of one or more of the above-described Embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-177841, filed on Sep. 2, 2014, which is hereby incorporated by reference herein in its entirety.

What is claimed is:

1. A light source unit comprising:
   a light source configured to emit excitation light having a first wavelength;
   a fluorescent member configured to emit, when irradiated with the excitation light from the light source, fluorescence light having a second wavelength different from the first wavelength; and
   an adjuster configured to adjust a conversion efficiency from the excitation light to the fluorescence light of the fluorescent member so that a gradient, denoted by T, satisfies:

$0.35G \leq T \leq 0.8G$ in a fluorescence characteristic of the fluorescent member when a horizontal axis represents a normalized light intensity of the excitation light so that a maximum light intensity of the excitation light incident on the fluorescent member is normalized to 1, and a vertical axis represents the light intensity of the fluorescence light emitted from the fluorescence member that is irradiated with the normalized light intensity of the excitation light, where G represents a gradient in the fluorescence characteristic when the normalized light intensity of the excitation light is 0.3.

2. The light source unit according to claim 1, wherein the adjuster adjusts the conversion efficiency by adjusting a light intensity of the excitation light incident on the fluorescent member.

3. The light source unit according to claim 1, wherein the adjuster adjusts a light intensity of the excitation light by changing an electric power applied to the light source.

4. The light source unit according to claim 1, wherein the adjuster intermittently drives the light source.

5. The light source unit according to claim 4, wherein the adjuster sets, when switching drive of the light source from continuous drive to intermittent drive, an electric power for driving the light source in the intermittent drive during driving times in a period, equal to an electric power for driving the light source in the continuous drive during a time equal to the period.

6. The light source unit according to claim 4, wherein intermittent drive includes a first driving time in which the light source is driven at a first electric power, a second driving time in which the light source is driven at a second electric power different from the first electric power.

7. The light source unit according to claim 1, wherein the light source unit includes a plurality of light sources, wherein the adjuster adjusts the number of the light sources to be turned on.

8. The light source unit according to claim 1, further comprising a condenser optical system configured to condense the excitation light on the fluorescent member, wherein the adjuster adjusts a light intensity of the excitation light by moving the condenser optical system in an optical-axis direction to adjust a condensation diameter of the excitation light on the fluorescent member.

9. The light source unit according to claim 1, further comprising a temperature adjuster configured to adjust a temperature of the fluorescent member, wherein the adjuster adjusts the conversion efficiency by controlling the temperature adjuster to change the temperature of the fluorescent member.

10. A projection-type display apparatus comprising:
    a light source unit; and
    a light modulator configured to modulate light from the light source unit based on an image signal,
    wherein the light source unit comprising:
    a light source configured to emit excitation light having a first wavelength;
    a fluorescent member configured to emit, when irradiated with the excitation light from the light source, fluorescence light having a second wavelength different from the first wavelength; and
    an adjuster configured to adjust a conversion efficiency from the excitation light to the fluorescence light of the fluorescent member so that a gradient, denoted by T, satisfies:

$0.35G \leq T \leq 0.8G$ in a fluorescence characteristic of the fluorescent member when a horizontal axis represents a normalized light intensity of the excitation light so that a maximum light intensity of the excitation light incident on the fluorescent member is normalized to 1, and a vertical axis represents the light intensity of the fluorescence light emitted from the fluorescence member that is irradiated with the normalized light intensity of the excitation light, where G represents a gradient in the fluorescence characteristic when the normalized light intensity of the excitation light is 0.3.

11. The projection-type display apparatus according to claim 10, wherein the adjuster adjusts the efficiency of conversion based on the image signal.

12. A method of controlling a light source unit that includes a light source configured to emit excitation light having a first wavelength, and a fluorescent member configured to emit, when irradiated with the excitation light from the light source, fluorescence light having a second wavelength different from the first wavelength, the method comprising the steps of:

adjusting a conversion efficiency from the excitation light to the fluorescence light of the fluorescent member so that a gradient, denoted by T, satisfies:

$0.35G \leq T \leq 0.8G$ in a fluorescence characteristic of the fluorescent member when a horizontal axis represents a normalized light intensity of the excitation light so that a maximum light intensity of the excitation light incident on the fluorescent member is normalized to 1, and a vertical axis represents the light intensity of the fluorescence light emitted from the fluorescence member that is irradiated with the normalized light intensity of the excitation light, where G represents a gradient in the fluorescence characteristic when the normalized light intensity of the excitation light is 0.3.

* * * * *